Feb. 21, 1939.  H. C. BOWEN  2,148,231
PRESSURE PRODUCING DEVICE FOR HYDRAULIC PRESSURE SYSTEMS
Filed Nov. 29, 1935
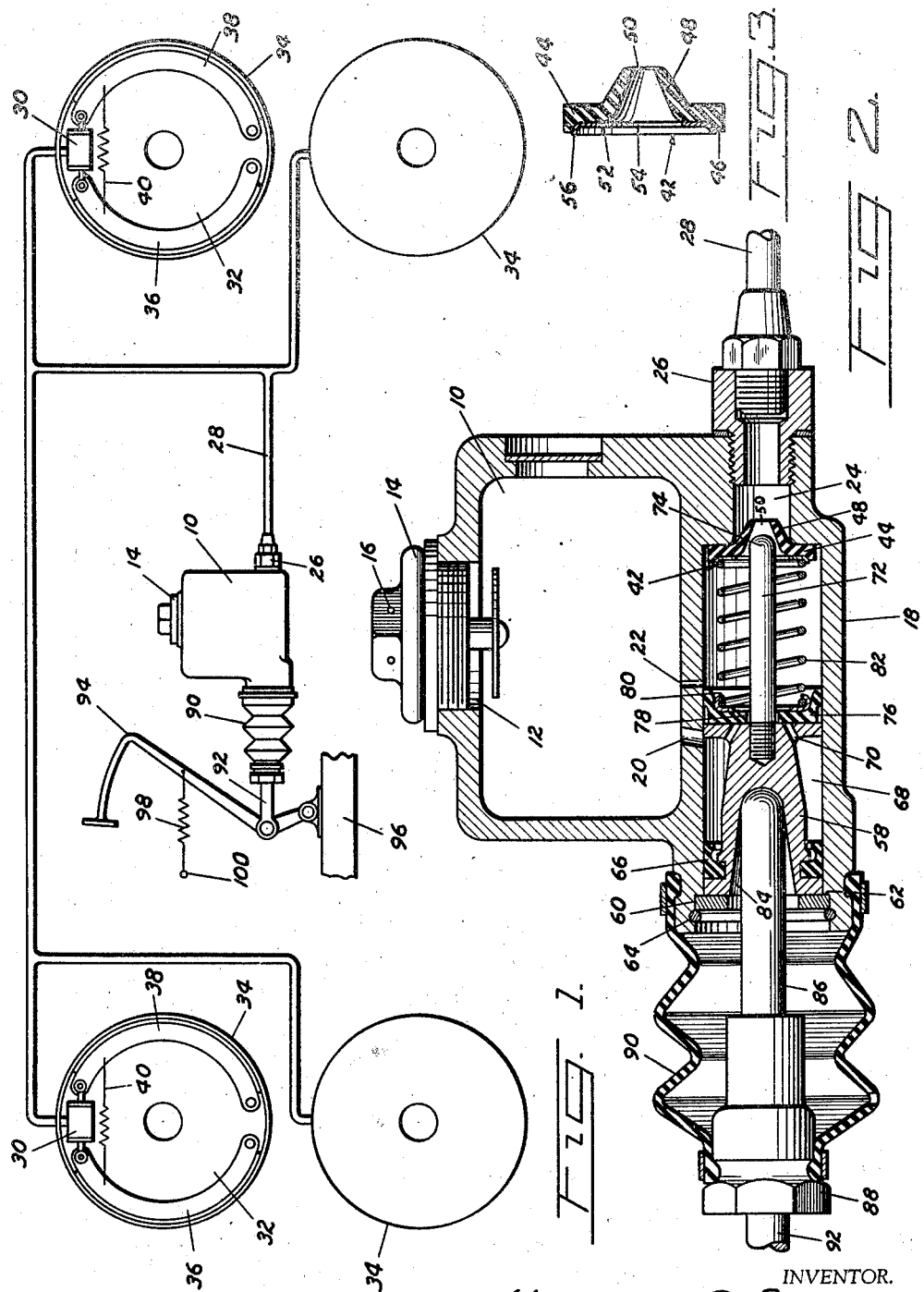
INVENTOR.
HERBERT C. BOWEN
BY Williams, Bradbury,
McCaleb & Hinkle.
ATTORNEYS.

Patented Feb. 21, 1939

2,148,231

UNITED STATES PATENT OFFICE

2,148,231

PRESSURE PRODUCING DEVICE FOR HYDRAULIC PRESSURE SYSTEMS

Herbert C. Bowen, Detroit, Mich., assignor to Hydraulic Brake Company, Detroit, Mich., a corporation of California Application November 29, 1935, Serial No. 51,994

4 Claims. (Cl. 60—54.6)

This invention relates to fluid pressure brake systems and more particularly to valve mechanisms for fluid pressure brake systems.

The invention comprehends a fluid pressure producing device comprising a fluid reservoir, a cylinder supplied therefrom, a piston movable in the cylinder, and a valve for control of the discharge port of the cylinder to inhibit retrograde movement of fluid during the compression stroke of the piston.

The above and other objects and features of the invention including the various novel and desirable details of construction will appear from the following description of the illustrated embodiment of the invention shown in the accompanying drawing, in which, Fig. 1 is a schematic view of a brake system embodying the invention;

Fig. 2 is a vertical sectional view of the pressure producing device; and

Fig. 3 is an enlarged detail view.

Referring to the drawing for more specific details of the invention, 10 represents a reservoir having a filling opening 12 closed as by a plug 14 provided with suitable openings 16 for venting the reservoir to the atmosphere. A cylinder 18 formed in the bottom of the reservoir has ports 20 and 22 providing communications between the cylinder and the reservoir and a discharge port 24.

A coupling 26 threaded in the discharge port has connected thereto a fluid pressure delivery pipe or conduit 28 having branches connected respectively to fluid pressure actuated motors 30 for the actuation of brakes associated with the wheels of a motor vehicle. The motors are arranged in pairs, one pair for actuating the brakes associated with the front wheels of the vehicle and the other pair for actuating the brakes associated with the rear wheels of the vehicle.

Each brake is of a conventional type including a fixed support or backing plate 32, a rotatable drum 34 associated therewith, interchangeable friction elements or shoes 36 and 38 having their articulated ends pivoted on the backing plate, and a fluid pressure actuated motor corresponding to the motors 30 arranged on the backing plate between the separable ends of the shoes and operative to spread the shoes into engagement with the drum against the resistance of a retractile spring 40.

A valve, indicated generally at 42, controls the discharge port 24 of the cylinder. This valve includes a flexible disk 44, preferably of rubber. The disk has a peripheral or marginal flange 46 and a coaxial frusto-conical portion 48 which extends in an oppositely disposed direction to the flange. This frustro-conical portion has a tapered opening 50 gradually decreasing in diameter from the base of the frusto-conical portion to the top thereof. The disk 44 is seated on the head of the cylinder with the frusto-conical portion extended into the discharge port 24 and its flange extended into the cylinder, and seated on the disk is a spring seat including a metallic disk 52 having an axial opening 54 registering with the opening in the frusto-conical portion and a flange 56 embraced by the flange 46 of the flexible disk 44 to provide against displacement of the spring seat.

A piston 58 reciprocable in the cylinder 16 is held against displacement by a washer 60 seated on an annular shoulder 62 formed in the open end of the cylinder and secured in position by a retaining ring 64 seated in a groove in the wall of the cylinder. The skirt of the piston carries a leak-proof washer 66 which provides against seepage of fluid from the cylinder past the piston, and the body of the piston has a reduced portion providing in conjunction with the wall of the cylinder an annular chamber 68 communicating with the reservoir 10 as by way of the port 20, and the head of the cylinder has a plurality of ports 70 providing communications between the annular chamber 68 and that portion of the cylinder forward of the head of the piston.

A pin 72 has one of its ends secured coaxially in the head of the piston and its other end extends forward into the tapered opening 50 in the frustro-conical portion of the flexible disk 44. The free end of the rod is round, as indicated at 74, to provide against injury to the wall of the frustro-conical portion of the disk 44, and when the piston is in fully retracted position this round portion of the pin is in the opening but does not fully close the same.

A collapsible leak-proof cup 76 seated on the head of the piston for control of the ports 70 in the piston and the port 22 has a concentric opening 78 through which the pin 72 extends. This opening receives the pin with sufficient clearance to provide for the free passage of fluid from that portion of the cylinder back of the piston to that portion of the cylinder forward of the piston when the ports 70 are uncovered.

The cup 76 has thereon a spring seat 80, and a spring 82 interposed between this seat 80 and the spring seat on the valve 42 serves to retain the cup and the valve against displacement. The spring 82 also serves to return the piston to retracted position.

The piston 58 has in its back a recess 84 for the reception of one end of a thrust pin 86, the other end of which is secured to a coupling 88, and a flexible boot connects the coupling to the open end of the cylinder so as to exclude dust and other foreign substances from the cylinder. The coupling is connected by a rod 92 to a foot pedal lever 94 pivoted on a fixed support 96 and connected by a retractile spring 98 to a fixed support 100.

In operation, assuming that the system is filled with fluid and that the piston 58 is in fully retracted position, upon depressing the foot pedal lever 94 force is transmitted therefrom to the piston to move the piston on its compression stroke. During the initial movement of the piston on its compression stroke the cup 76 closes the port 22, and upon further movement of the piston on its compression stroke the round end 74 on the pin 72 closes the tapered opening 50 on the flexible disk 44 to inhibit retrograde movement of the fluid, and fluid in the cylinder forward of the piston is discharged therefrom through the opening 50 past the pin, through the discharge port 24, fluid pressure delivery pipe 28 and its branches, to the fluid pressure actuated motors 30, causing actuation of these motors with resultant spreading of the shoes into drum engagement against the resistance of the retractile spring 40.

Upon release of the foot pedal lever 94 the retractile spring 98 returns the lever to its retracted position. During this movement of the foot pedal lever the piston 58 is returned to its retracted position under the influence of the spring 82 assisted by fluid returning from the fluid pressure actuated motors under the influence of the retractile springs 40 connecting the shoes 36 and 38 of the respective brakes. While the piston is thus being returned, the fluid in the lines and wheel cylinders is under the force created by the return springs 40, and this force is sufficient to move the disk 44 away from the cylinder head, thereby permitting return flow of fluid into the master cylinder.

Because of friction on the fluid pressure delivery pipe 28 and its branches and the tensile strength of the springs 82, the piston 58 is returned to its retracted position slightly in advance of the return of fluid from the motors 30 to the cylinder 18. This causes a partial vacuum in the cylinder 18 forward of the head of the piston resulting in suction of fluid from the reservoir 10 through the port 20, the annular chamber 68, past the cup 76, into that portion of the cylinder 18 forward of the piston completely filling the cylinder. When the piston is in fully retracted position, the pin 72 disengages the wall of the frustro-conical portion of the disk 44 and the opening therein is uncovered. Thus when the fluid returns from the motors to the cylinder 18 under the influence of the retractile springs 40 any excess fluid in the cylinder is expelled therefrom through the port 22 into the reservoir.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid pressure system of the class described, comprising a compression cylinder having a discharge port, a fluid reservoir for said cylinder, means establishing communication between said cylinder and reservoir, a piston adapted for advancement toward said port to discharge fluid therethrough under pressure, a pin of materially less cross-section than said piston movable therewith, a flexible sealing member located at said port and normally out of sealing engagement with said pin, said pin being adapted to be brought into one-way sealing contact with said member by advancement of said piston, thereby preventing return to said cylinder of fluid discharged through said port, means for advancing said piston, and a spring for returning said piston and holding said flexible member in place.

2. A fluid pressure system of the class described, comprising a compression cylinder having a discharge port and a seat surrounding said port, a fluid reservoir for said cylinder, means establishing communication between said cylinder and said reservoir, a piston adapted for advancement toward said port to discharge fluid therethrough under pressure, a pin of materially less cross-section than said piston movable therewith, a flexible member constituting a two-way valve, said pin being brought into and out of one-way sealing engagement with said member by advancement and retraction of said piston, resilient means holding said flexible member on said seat, means for advancing said piston, a fluid-operated motor, means establishing fluid communication between said motor and said port, and fluid return means associated with said motor.

3. A fluid pressure system of the class described, comprising a compression cylinder having a discharge port, a fluid reservoir for said cylinder, means establishing communication between said cylinder and reservoir, a piston adapted for advancement toward said port to discharge fluid therethrough under pressure, a pin of materially less cross-section than said piston movable therewith, a sealing cup contacting with said piston, said cup having an opening receiving said pin, a flexible sealing member located at said port and normally out of sealing engagement with said pin said pin being adapted to be brought into one-way sealing contact with said member by advancement of said piston, thereby preventing return to said cylinder of fluid discharged through said port, means for advancing said piston, and a spring for holding both said cup and flexible sealing member in place.

4. A hydraulic brake system of the class described, comprising a compression cylinder having a discharge port, a fluid reservoir for said cylinder, means establishing communication between said cylinder and reservoir, a piston adapted for advancement toward said port to discharge fluid therethrough under pressure, a pin of materially less cross-section than said piston movable therewith, a flexible sealing member located at said port and constituting a two-way valve, said pin adapted to be brought into and out of one-way sealing engagement with said sealing member by advancement and retraction of said piston, said sealing member forming a seal with said pin which prevents return flow of fluid to said cylinder between said sealing member and pin, means including a spring and disc for holding said sealing member in position to prevent return flow through said port, brake operating means, means establishing communication between said brake operating means and said port, and fluid return means associated with said brake operating means.

HERBERT C. BOWEN.